(12) United States Patent
Yoneda (10) Patent No.: US 9,554,082 B2
(45) Date of Patent: Jan. 24, 2017

(54) RECORDING APPARATUS, RECORDING METHOD, AND PROGRAM

(71) Applicant: CANON KABUSHIKI KAISHA, Tokyo (JP)

(72) Inventor: Shigeru Yoneda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/183,818

(22) Filed: Feb. 19, 2014

(65) Prior Publication Data

US 2014/0241697 A1    Aug. 28, 2014

(30) Foreign Application Priority Data

Feb. 26, 2013 (JP) ................... 2013-035895

(51) Int. Cl.
| | |
|---|---|
| *H04N 9/80* | (2006.01) |
| *H04N 5/91* | (2006.01) |
| *H04N 9/82* | (2006.01) |
| *G11B 27/10* | (2006.01) |
| *G11B 27/32* | (2006.01) |
| *H04N 5/77* | (2006.01) |
| *H04N 9/79* | (2006.01) |

(52) U.S. Cl.
CPC ............ *H04N 5/91* (2013.01); *G11B 27/105* (2013.01); *G11B 27/329* (2013.01); *H04N 9/8205* (2013.01); *H04N 5/772* (2013.01); *H04N 9/7921* (2013.01)

(58) Field of Classification Search
CPC ... H04N 9/7921; H04N 5/772; H04N 5/23245
USPC ........................................................ 386/248
See application file for complete search history.

(56) References Cited

U.S. PATENT DOCUMENTS

2009/0309988 A1* 12/2009 Kubo et al. ................ 348/220.1

FOREIGN PATENT DOCUMENTS

JP        2010-183248 A      8/2010

* cited by examiner

*Primary Examiner* — Thai Tran
*Assistant Examiner* — Jose Mesa
(74) *Attorney, Agent, or Firm* — Carter, DeLuca, Farrell & Schmidt, LLP (57) ABSTRACT

A recording apparatus is arranged to control a file name of recorded moving image file and a file name of the recorded still image file, so as to, after a recording stop instruction, in accordance with the file name of at least one of the moving image file and still image file recorded in a period of time from a recording start instruction to the recording stop instruction, change the file name of at least one of the moving image file and still image file recorded in that period so that the file names of the plurality of moving image files recorded in that period have consecutive file numbers corresponding to recording order of the moving image files and the file names of the plurality of still image files recorded in that period have consecutive file numbers corresponding to recording order of the still image files.

9 Claims, 8 Drawing Sheets

RECORDING APPARATUS, RECORDING METHOD, AND PROGRAM

BACKGROUND OF THE INVENTION

Field of the Invention

The present invention relates to a recording apparatus and, more particularly, to a recording apparatus and a recording method for recording a moving image file and a still image file.

Description of the Related Art

In the related arts, a recording apparatus for recording moving image data and still image data into a recording medium has been known. In such a type of recording apparatus, the recorded moving image data and still image data are managed as files in accordance with a predetermined file system.

As a naming method of file names at she time of recording moving image and still image files, for example, a method of including numbers into the file names like a DCF (Design rule for Camera File system) standard has been known. Generally, consecutive numbers are added to the file names in recording order.

A construction in which a file is recorded in such a manner that the file is divided during the recording of the moving image data so that a file size does not exceed an upper limit size specified by the file system has also been proposed (for example, refer to the Official Gazette of Japanese Patent Application Laid-Open No. 2010-183248).

An apparatus which can also record still images during the recording of a moving image signal is also widespread.

In the case where the consecutive numbers are added to the file names and a moving image is recorded in such a manner that the file is divided as mentioned above, if a still image is recorded during the recording of the moving image, the next number of the file name of the moving image which is being recorded at that point of time will be allocated to the still image.

Therefore, the number of the moving image file after the file division becomes the next number of the number allocated to the still image, and a state where it is not consecutive to the number of the moving image file before the file division happens.

If the moving image and image recorded as mentioned above are reproduced in order of the file numbers, there is such a problem that a plurality of moving image files which are consecutively photographed are not consecutively reproduced and the still image is reproduced between the reproduced moving image files.

In consideration of the foregoing problems, it is an aspect of the invention to realize a consecutive reproduction of a plurality of moving image files recorded during the recording of one time even in the case where a still image is recorded during the recording of a moving image.

SUMMARY OF THE INVENTION

To accomplish the above aspect, according to the invention, a recording apparatus comprising: an image pickup unit; a generation unit configured no generate moving image data and still image data by using an image signal obtained by the image pickup unit; a recording unit configured to record a moving image file including the moving image data and a still image file including the still image data into a recording medium, wherein the recording unit records a plurality of moving image files for a period of time from a recording start instruction of a moving image to a recording stop instruction of the moving image, and the recording unit records the still image file in accordance with a still image recording instruction provided during the recording of the moving image file; and a control unit configured to control a file name of the moving image file which is recorded by the recording unit and a file name of the still image file which is recorded by the recording unit, wherein each of the file name of the moving image file and the file name of the still image file includes a file number, and wherein the control unit adds file names to the plurality of moving image files and the plurality of still image files which are recorded in the period of time from the recording start instruction to the recording stop instruction, and after the recording stop instruction, in accordance with the file name of at least one of the moving image file and the still image file recorded in the period of time from the recording start instruction to the recording stop instruction, the control unit changes the file name of at least one of the moving image file and the still image file recorded in the period of time from the recording start instruction to the recording stop instruction so that the file names of the plurality of moving image files recorded in the period of time from the recording start instruction to the recording stop instruction have consecutive file numbers corresponding to recording order of the moving image files and the file names of the plurality of still image files recorded in the period of time from the recording start instruction the recording stop instruction have consecutive file numbers corresponding to recording order of the still image files.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

First Embodiment

Figure 1:
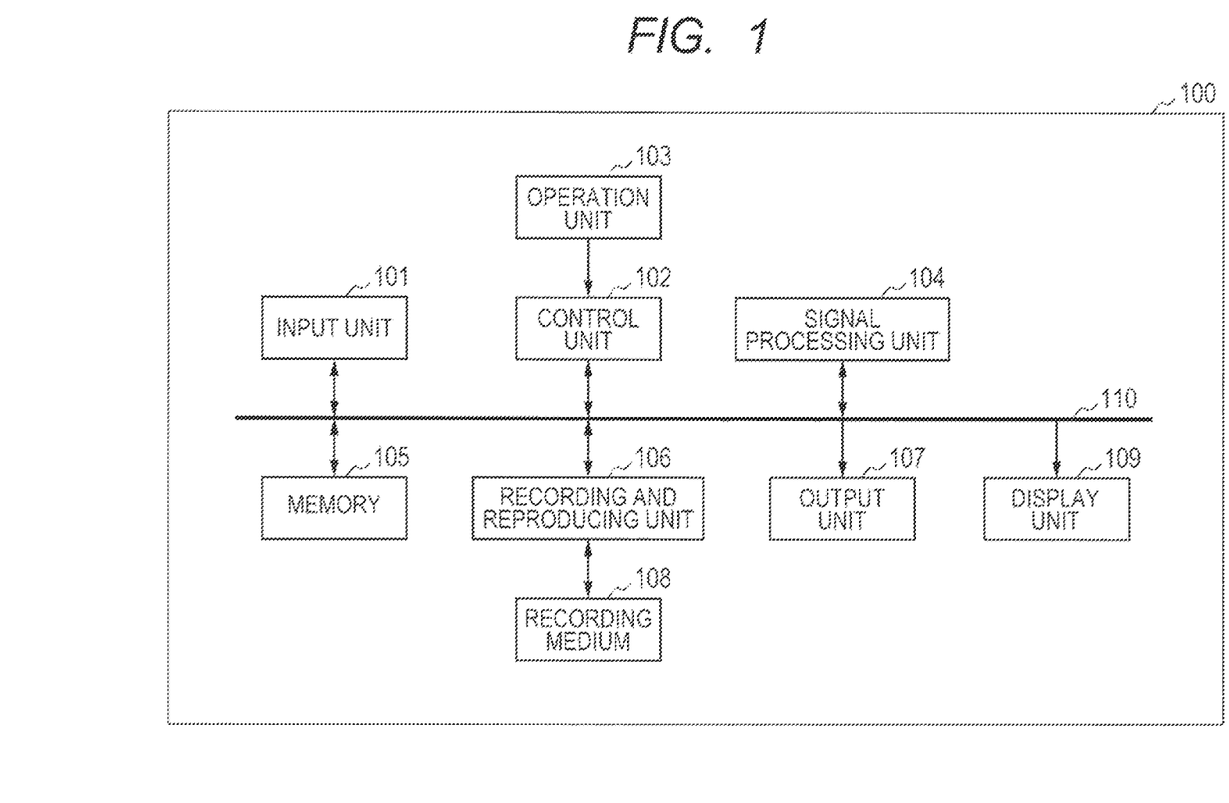
FIG. 1 is a block diagram illustrating an example of a construction of a recording apparatus according to the first embodiment of the invention.

FIG. 1 is a block diagram illustrating an example of a construction of a recording apparatus 100 according to the present embodiment. The recording apparatus is an apparatus which can be applied to an image pickup apparatus such as a video camera or the like which can photograph a moving image.

In FIG. 1, an input unit 101 obtains moving image data, audio data, and still image data and outputs them. The input unit 101 includes an image pickup unit and a microphone. The moving image data and still image data are obtained from image data and output by the image pickup unit. The audio data is obtained and output by the microphone. The input unit 101 outputs the moving image data in a recording standby state or a recording state of a moving image. In the recording standby state or if there is a still image recording instruction during the recording of the moving image, the input unit 101 generates and outputs still image data of one picture.

A control unit 102 controls the whole operation of the recording apparatus 100 in accordance with an input from an operation unit 103. The control unit 102 includes a microcomputer, a memory, and the like and controls the recording apparatus 100 in accordance with a computer program (software) stored in a nonvolatile memory (not shown). The control unit 102 also includes a recording medium interface to communicate data and commands with a recording and reproducing unit 106. The operation unit 103 includes various kinds of switches which can be operated, by the user. The operation unit 103 receives various kinds of instructions or the like which are made by the user and notifies the control unit 102 of them. The operation unit 103 also includes a power switch, a switch to instruct the start/stop of the recording, a switch to change over a mode of the recording apparatus 100, and the like.

Upon recording, in accordance with a well-known coding method such as MPEG, JPEG, or the like, a signal processing unit 104 codes the moving image data, audio data, and still image data which are input by the input unit 101 and compresses their information amounts. The signal processing unit 104 executes processes necessary to record the moving image data, audio data, and still image data. Upon reproduction, the signal processing unit 104 decodes the reproduced moving image data, audio data, and still image data and expands their information amounts. Upon recording, the signal processing unit 104 outputs information of code amounts (data amounts) of the coded moving image data, audio data, and still image data to the control unit 102.

A memory 105 stores the moving image data, audio data, and still image data. Each block of the recording apparatus 100 accesses the memory 105, thereby processing the moving image data, audio data, and still image data. Besides the moving image data, audio data, and still image data, she memory 105 stores various kinds of information such as information of a file system, management information, and the like and, further, plays a role of a work memory or the like for the control which is made by the control unit 102.

The recording and reproducing unit 106 writes or reads out the moving image data, audio data, and still image data or the various kinds of information into/from a recording medium 108. Upon recording, the recording and reproducing unit 106 writes the moving image data, audio data, and still image data stored in the memory 105 into the recording medium 108. Upon reproduction, the recording and reproducing unit 106 reads out the moving image data, audio data, and still image data from the recording medium 108 and stores into the memory 105. In the present embodiment, the recording medium 108 is a random access recording, medium such as hard disk (HDD), flash memory card, or the like.

In accordance with a file system such as FAT (File Allocation Table) or the like, the recording and reproducing unit 106 manages, as files, the moving image data, audio data, still image data, and various kinds of information which are recorded into the recording medium 108. The recording and reproducing unit 106 has a well-known interface (IF) such as ATA (AT Attachment) or the like and communicates data and various kinds of commands with a recording medium IF in the control unit 102. Although the apparatus is constructed in such a manner that the recording medium 108 can be easily loaded and unloaded to from the recording apparatus 100 by a loading and unloading mechanism (not shown), it is also possible to construct in such a manner that each recording medium 108 is built in the recording apparatus 100.

In the case where a moving image file including the moving image data, audio data, and still image data is written or read out into/from the recording, medium 108, the control unit 102 controls the recording and reproducing unit 106 so as to reproduce file system data (management data) from the recording medium 108 and store into the memory 105. The file system data is data showing a file name, a file size, a recording address, and the like of the data recorded in the recording medium 108 and is information to manage the file. The control unit 102 controls the writing and read-out of the file in accordance with the read-out file system data. The control unit 102 updates the file system data stored in the memory 105 in accordance with the writing of the file into the recording medium 108. The updated file system data is recorded in the recording medium 108 by the recording and reproducing unit 106.

By operating the operation unit 103, the user can instruct a change-over an operation mode of the recording apparatus 100, the recording start/stop of the moving image data, the recording of the still images, or the like. An output unit 107 outputs the reproduced moving image data, audio data, and still image data to an external display apparatus or the like of the recording apparatus 100. A display unit 109 displays the moving image or various kinds of information to a display apparatus such as a liquid crystal panel or the like. A data bus 110 is used to transmit and receive data, various kinds of control commands, or the like to/from each unit of the recording apparatus 100.

Subsequently, the recording operation in the present embodiment will be described. First, when an instruction to shift the operation mode to a recording mode of the moving image data is received from the operation unit 103, the recording apparatus 100 is shifted to the recording standby state and the apparatus waits for a recording start instruction. In the recording standby state, a moving image corresponding to the moving image data which is input from the input unit 101 is displayed to the display unit 109. When the recording start instruction of the moving image data is input from the operation unit 103, the signal processing unit 104 reads out the moving image data which is input by the input unit 101 and stored in the memory 105 and starts a coding of the moving image data. The data coded by the signal processing unit 104 is stored in the memory 105.

In the present embodiment, a data rate of the data coded by the signal processing unit 104 is lower than a data rate at which the recording in the recording medium 108 can take place. Therefore, in the present embodiment, the coded data is temporarily stored in the memory 105. Each time a data amount of the coded data stored in the memory 105 reaches a first predetermined amount, the recording and reproducing unit 106 reads out the coded data from the memory 105 and records into the recording medium 108. At a point of time when the coded data stored in the memory 105 decreases to a second predetermined amount smaller than the first predetermined amount, the read-out of the coded data from the memory 105 is temporarily stopped and the recording process to the recording medium 108 is interrupted in this manner, the process is repeated. At this time, when the file is not open, a file to record the coded data is newly generated and opened and the coded data is recorded as a moving image file.

Each time the writing of one time into the recording medium is completed, the control unit 102 updates the file system data (management information) stored in the memory 105 on the basis of a recording position or the like of the coded data which is written this time. The control unit 102 controls the recording and reproducing unit 106 so as to read out the updated file system data from the memory 105 and records into the recording medium.

Figure 4:
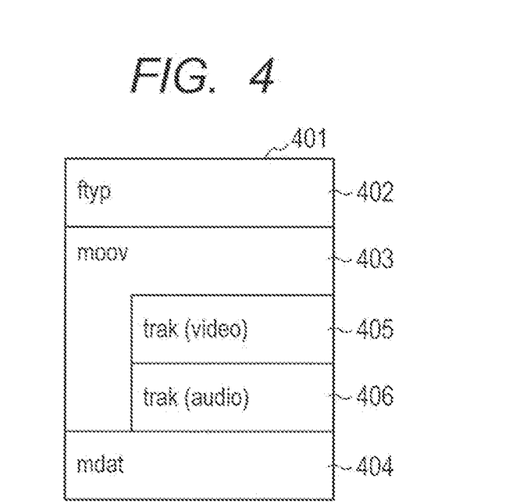
FIG. 4 is a diagram illustrating an example of a construction of a moving image file.

In the present embodiment, the moving image file is recorded in accordance with the MP4 file method. FIG. 4 is a diagram illustrating an example of a construction of an MP4 file 401. MP4 has a tree structure as illustrated in FIG. 4 and has elements each called a box.

An ftyp box, an moov box, and an mdat box exist in a box of the highest layer. Interchangeability information is stored in ftyp 402. The management information regarding the moving image data and audio data is stored in moov 403. The real data of the moving image data and audio data is stored in mdat 404. Upon recording, the moving image data and audio data are recorded into mdat in such a manner that those data are being additionally stored. A plurality of trak 405 and 406 are stored in moov 403.

In the present embodiment, the control unit 102 monitors a size of the file which is being recorded on the basis of a notification from the recording and reproducing unit 106 or the signal processing unit 104. If the size of the file being recorded reaches a threshold value (file division threshold value) for deciding whether or not the file division is performed, the file being recorded is closed, a moving image file is newly generated, and then the recording is continued. In the present embodiment, the file division threshold value is decided on the basis of an upper limit of the file size determined by the file system. That is, in the present embodiment, the file division threshold value is set to an amount which is smaller than the upper limit of the file size by a predetermined amount.

In the case of using the FAT32 file system, since there is such a restriction that the maximum value of one file size is equal to 4 gigabytes (GB), the file division threshold value is set to a predetermined value smaller than 4 GB corresponding to the upper limit.

If the file size reaches the file division threshold value during the recording, the control unit 102 instructs the recording and reproducing unit 106 so as to close the file which is open at present, open a new file, and continue the recording of the coded data. As mentioned above, each time the file size reaches the file division threshold value during the recording of the moving image, the recording is continued while the file is being divided.

If the recording stop instruction of the moving image data is received from the operation unit 103 during the recording of the moving image, the control unit 102 stops the coding of the moving image data which is executed by the signal processing unit 104, and the file being recorded is closed by the recording and reproducing unit 106. The control unit 102 instructs the recording and reproducing unit 106 so as to change the contents of the file system data and record into the recording medium.

If a recording instruction of the still image data is received from the operation unit 103 during the recording of the moving image, the control unit 102 codes the still image data by the signal processing unit 104 and stores the coded still image data into the memory 105.

In the present embodiment, if a recording instruction of the still image is output in the recording standby state, the control unit 102 outputs the still image data of one picture by the input unit 101. The still image data is coded by the signal processing unit 104 by a coding method such as JPEG or the like and recorded as a still image file into the recording medium 108 by the recording and reproducing unit 106.

Figure 3A:
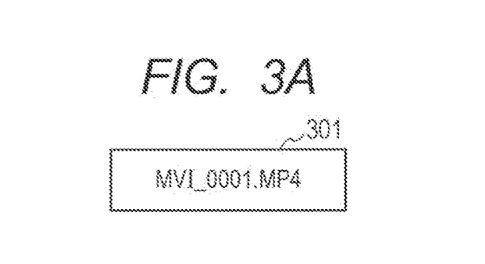
FIGS. 3A and 3B are diagrams illustrating an example of states of recorded moving image files.
Figure 3B:
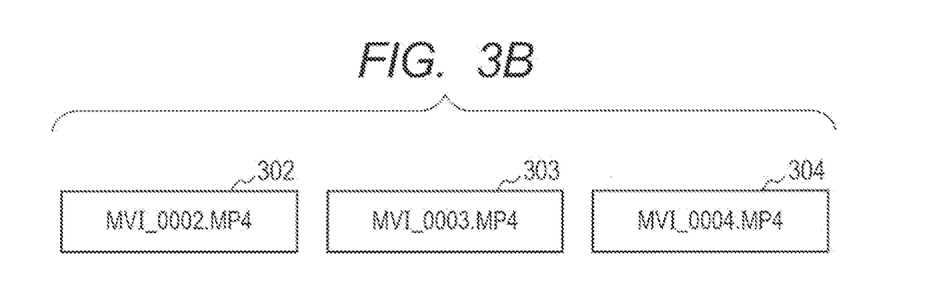

FIGS. 3A and 3B are diagrams illustrating contents of moving image files which are recorded into the recording medium in the recording apparatus of the present embodiment. FIG. 3A illustrates the contents of the moving image file in the case where a plurality of moving image files are not recorded in the period of time from the recording start instruction the recording stop instruction. A moving image file 301 is generated in response to the recording start and before a size of moving image file 301 reaches the File division threshold value, the recording stop is instructed.

FIG. 3B illustrates the contents of the moving image files in the case where three moving image files are recorded in the period of time from the recording start instruction to the recording stop instruction. A moving image file 302 is generated in response to the recording start. When a size of moving image file 302 reaches the file division threshold value, the file 302 is closed and a new file 303 is generated. When a size of moving image file 303 reaches the file division threshold value, the file 303 is closed and a new file 304 is generated. The recording stop instruction is made during the recording of the moving image file 304 and the recording is stopped.

Figure 2:
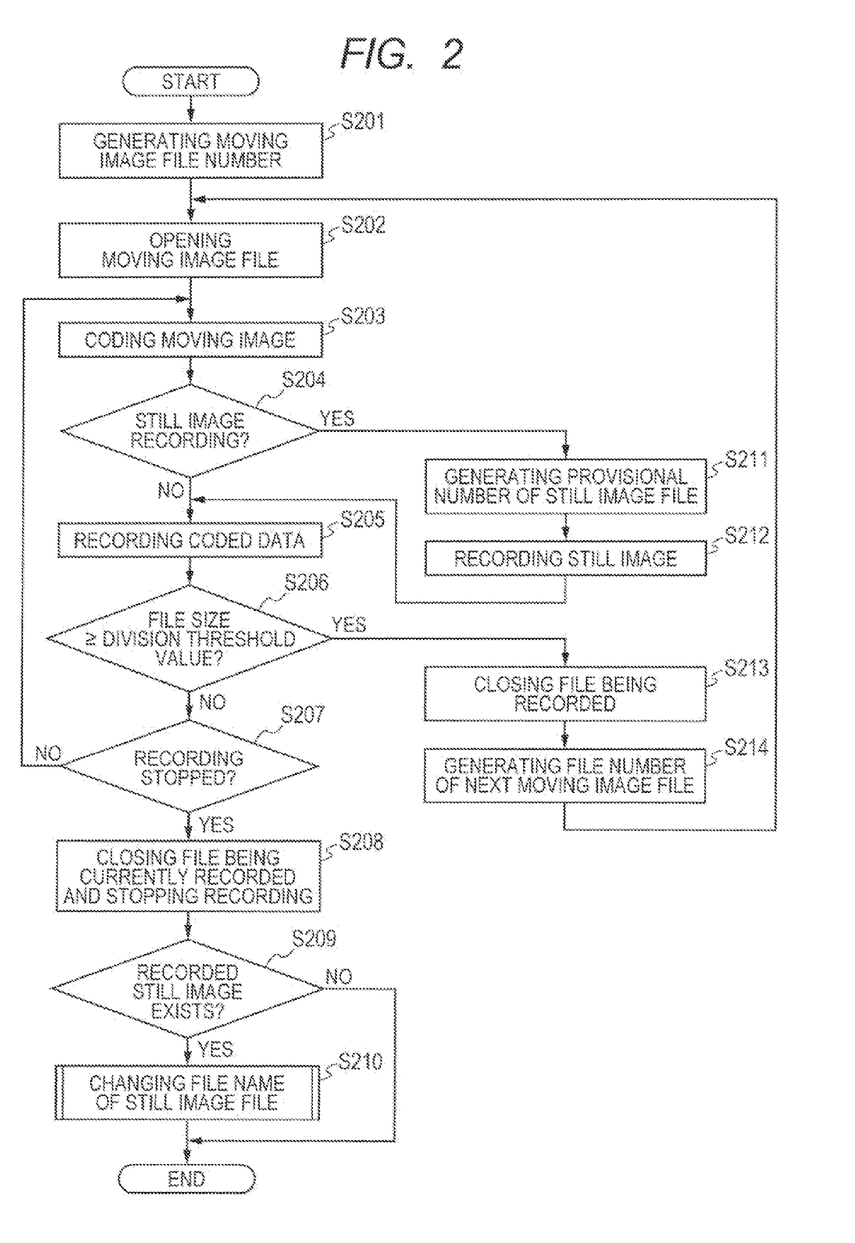
FIG. 2 is a diagram illustrating a flowchart of she recording operation in the recording apparatus according to the first embodiment of the invention.

Subsequently, the operation during the recording of the moving image data in the recording apparatus of the present embodiment will be described with reference to a flowchart of FIG. 2. The operation in FIG. 2 is executed by a method whereby the control unit 102 controls each unit. In the present embodiment, as a file name of the file of a series of moving image data or still image data which is recorded, a file name including a number provided as a consecutive number is added and recorded. In the present embodiment, for example, it is assumed that the file name is added in accordance with a predetermined format such as a DCF standard. However, a provisional file name according to a predetermined rule which does not correspond to the DCF standard is added to the still image file to be recorded during the recording of the moving image as will be described hereinafter. After the recording of the moving image is stopped, the provisional file name is changed to a file name including a consecutive number in accordance with the DCF standard.

When the recording start instruction of the moving image is input from the operation unit 103 in the recording standby state, the operation of FIG. 2 is started. First, the control unit 102 generates a number which is used for the file name of the moving image file (S201). For example, in the recording standby state, the control unit 102 confirms the file names of the moving image file and the still image file recorded in the recording medium 108 and sets the next number of the maximum number (last number) among the numbers included in the file names of the respective files to the number of the moving image file or the still image file which is subsequently recorded. Or, the next number of the number used when the moving image file is recorded last time is set to the number of the moving image file or the still image file which is subsequently recorded. For example, if the file 301 in FIG. 3A is recorded in the recording medium 108 at the time of the recording start, the last number is equal to 0001. Therefore, the control unit 102 generates the number 0002 obtained by adding a predetermined number, that is, "1" in this instance to such a number. After the file number corresponding to the recording order of the files is generated as mentioned above, the control unit 102 instructs the recording and reproducing unit 106 so as to open the moving image file (S202). Subsequently, the control unit 102 controls the signal processing unit 104 so as to start the coding of the moving image data and audio data (S203) and stores coded data into the memory 105.

In parallel with the coding of the moving image data and audio data, the control unit 102 discriminates whether or not a still image recording instruction received, from the operation unit 103 (S204). If the still image recording instruction is received, the control unit 102 generates a provisional number to be added to the still image file (S211). At this time, if the still image recording instruction is the first instruction provided after the recording of a moving image file being currently recorded is started, the control unit 102 generates the same number as the number of the moving image file being currently recorded as a provisional number for the still image file. If the still image recording instruction is the second or subsequent instruction provided after the recording of the moving image is started, the control unit 102 generates a value obtained by adding a predetermined number ("1" in this instance) to the number of the still image file which is recorded last time as a provisional number for the still image file.

The control unit 102 instructs the input unit 101 so as to output the still image data. The input unit 101 generates still image data of one picture in response to an instruction from the control unit 102 and outputs to the signal processing unit 104. The signal processing unit 104 compresses the generated still image data and outputs to the recording and reproducing unit 106. A provisional file name is added to the compressed still image data by the recording and reproducing unit 106 by using the generated number and the still image file is recorded into the recording medium 108 (S212).

If the still image recording instruction is not output in S204, the control unit 102 instructs the recording and reproducing unit 106 so as to write the data. The recording and reproducing unit 106 reads out the coded data from the memory 105 and records into the recording medium 108 (S205). If a data amount of the unrecorded coded data stored in the memory 105 is smaller than a threshold value adapted to stop the writing, the control unit 102 instructs the recording and reproducing unit 106 so as to stop the writing, thereby temporarily stopping the writing of the coded data into the recording medium 108.

When the writing operation of one time is finished, the control unit 102 discriminates whether or not a file size of the moving image file being currently recorded is equal to or larger than the division threshold value for the file division (S206). If the file size does not reach the file division threshold value, the control unit 102 discriminates whether or not a recording stop instruction is output and if the recording stop instruction is not output, the processing routine is returned to S203 and the recording operation is continued (S207).

If the file size of the moving image file being recorded is equal to or larger than the file division threshold value in S206, the control unit 102 controls the recording and reproducing unit 106 so as to close the moving image file being recorded (S213). Subsequently, the control unit 102 generates a file number of the next moving image file (S214). In this instance, the control unit 102 adds a predetermined value to the number used for the closed file and sets a resultant number to the number which is used for the next moving image file. The processing routine is returned to a process for opening a new moving image file (S202).

Figure 6:
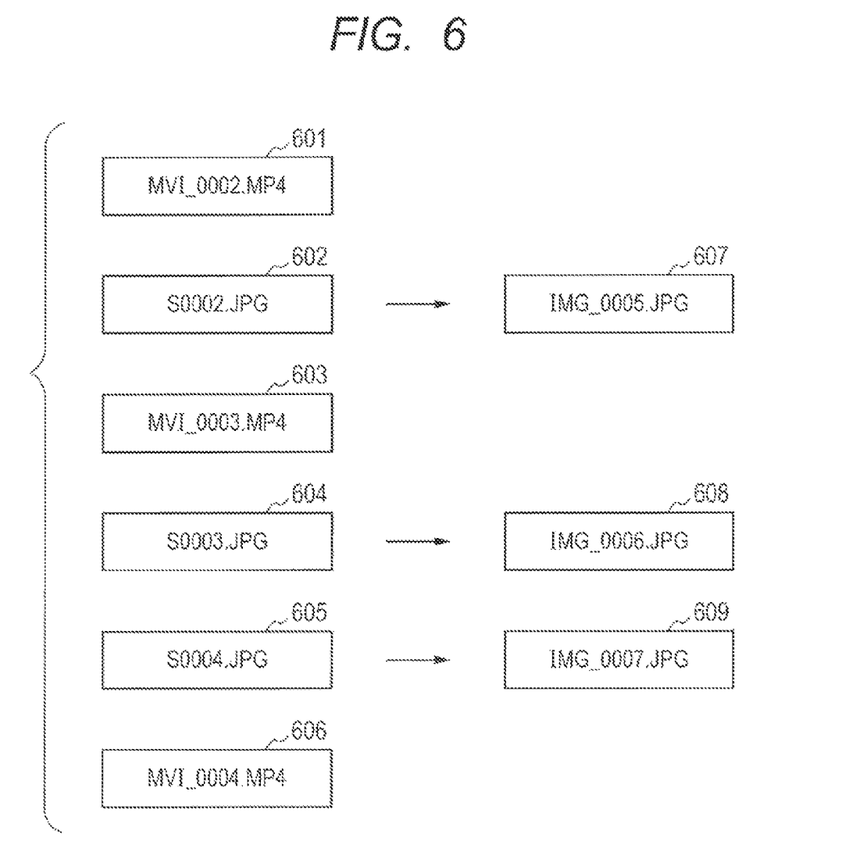
FIG. 6 is a diagram illustrating an example of a change of the file name.

FIG. 6 illustrates an example of file names which are added to each moving image file and the still image file in the case where the still image recording instruction is made during the recording of the moving image. In FIG. 6, files 601, 603, and 606 are moving image files and consecutive numbers are added to those three moving image files, respectively. A file 602 is a still image file recorded during the recording of the moving image file 601. Files 604 and 605 are still image files recorded during the recording of the moving image file 603. The same number 0002 as the number used for the moving image file 601 is added as a provisional number to the still image file 602. A value obtained by adding a predetermined value to the provisional number of the still image file recorded immediately before is added as a provisional number to the still image files 604 and 605.

If the recording stop instruction is made in S207, the control unit 102 controls the recording and reproducing unit 106 so as to record the unrecorded coded data stored in the memory 105 into the recording medium 108, close the file being recorded, and stop the recording (S208). Subsequently, the control unit 102 discriminates whether or not the still image is recorded during the recording of the moving image this time (S209). If no still image is recorded during the recording of the moving image this time, the recording operation is finished as it is. If the still image is recorded, the control unit 102 executes a process to change the file name of the still image file recorded during the recording of the moving image this time (S210).

Figure 5:
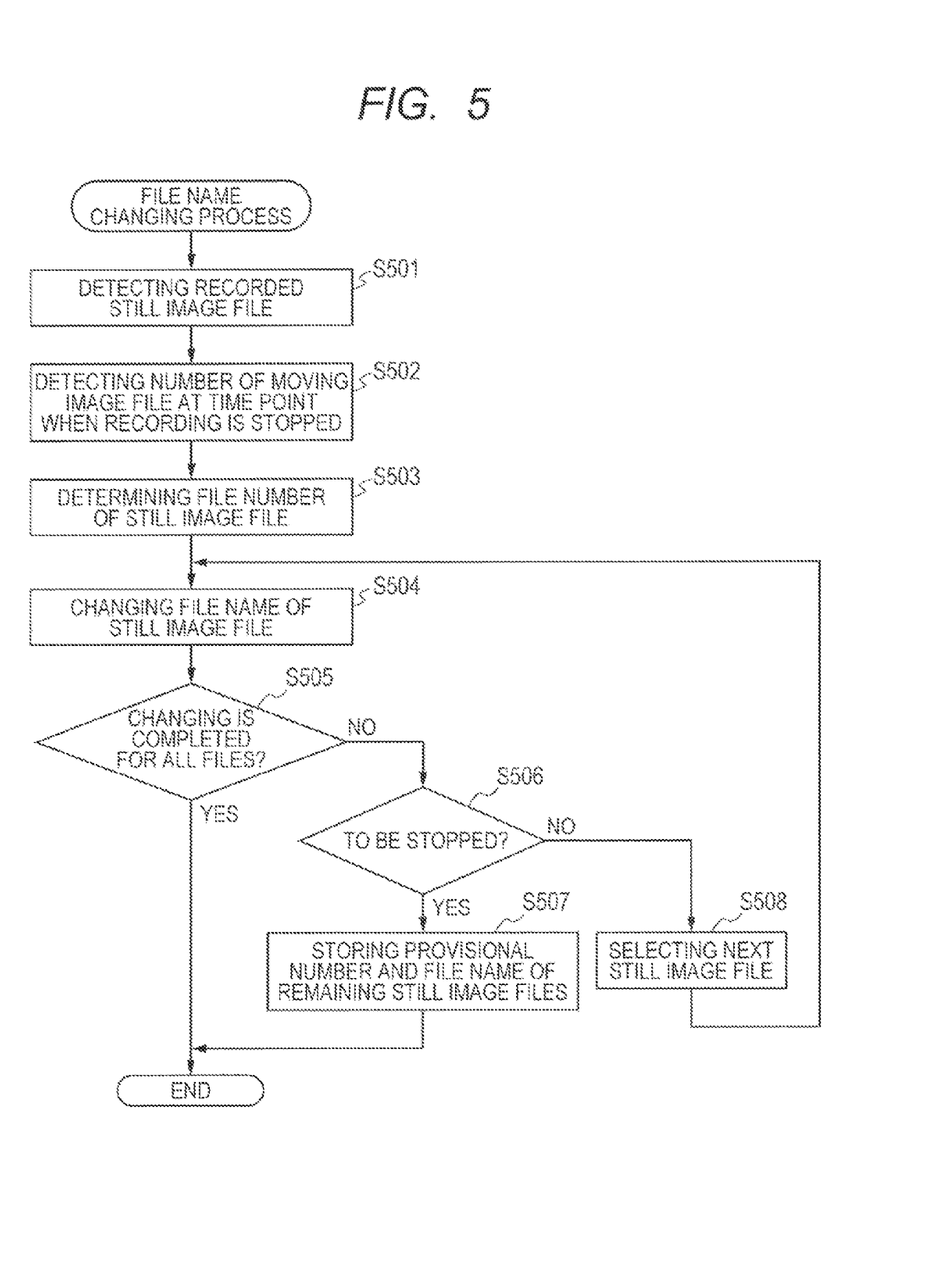
FIG. 5 is a diagram illustrating a flowchart for a change process of a file name in the recording operation according to the first embodiment of the invention.

FIG. 5 is a flowchart illustrating the change process of the file name of the still image file in S210 of the recording operation. First, the control unit 102 detects the still image files recorded in the recording medium 108 during the recording of the moving image this time and stores the provisional file name added to each still image file into the memory 105 (S501). Subsequently, the control unit 102 detects the file number added to the moving image file recorded at the time of the recording stop of the moving image this time and stores into the memory 105 (S502). The control unit 102 decides the file number subjected to the change of each still image file, on the basis of the moving image file recorded at the time of the recording stop (S503). Specifically speaking, the control unit 102 sets the number obtained by adding the predetermined value to the file number of the moving image file at the time of the recording stop into the file, number of the still image file in which the same number as the number used for the file name of the moving image file at the time of the recording start as a provisional number. With respect to each of the subsequent still image files, the number which increases by a predetermined value at a time is determined as a file number.

For example, in FIG. 6, the number of the still image file 602 to which the same number as the number of the leading moving image file among the moving image files recorded one time is added as a provisional number is set to 0005 which is provided by adding "1" to the number 0004 of the last moving image file. With respect to the file number of each of the subsequent still image files 604 and 605, "1" is added thereto at a time, thereby setting into the numbers 0006 and 0007.

As mentioned above, after the number to be added to each still image file is decided, the control unit 102 controls the recording and reproducing unit 106 so as to change the file name of the still image file (S504). The control unit 102 executes the change process from the still image file to which the largest number is added as a file number subjected to the change among the still image files.

After completion of the change of the file name to one still image file, the control unit 102 discriminates whether or not the change process of the file name is executed to all of the still image files (S505). If there are remaining still image files, the control unit 102 discriminates whether or not the change process is interrupted (S506).

If the number of still images recorded during the recording of the moving image is large, a case where it takes a long time to execute the change process of the file name is considered. The moving image or still image cannot be photographed for a period of time during which the change process of the file name is being executed. Therefore, in the present embodiment, even on the way of the change process of the file name, if a photographing start instruction of the moving image or still image is provided, the change process of the file name is interrupted.

When the file name of the still image file is changed, the change process is executed from the still image file to which the largest number is added. By such a method, in the case where the change process is interrupted and the recording of the moving image is started, the number obtained by adding "1" to the largest number can be generated as a number which is used for the file name of the moving image or still image file of the next time.

Thus, in the case of interrupting the change process, the control unit 102 stores the provisional file names of the remaining still image files and the file numbers subjected to the change, into the memory 105 and finishes the change process (S507). Besides the photographing instruction, even if an instruction to turn off the power source or an unloading instruction of the recording medium 108 is made, the change of the file name of the still image file is interrupted.

If the change process is not interrupted in S506, the control unit 102 selects the next still image file, returns to S504, and continues the change process (S508).

Still image files 607 to 609 in FIG. 6 are still image files subjected so the file name change. As a file number of the still image file 607, a consecutive value of the file number of the last moving image file 606 is added. A value which is increased in recording order is added as a file number to each of the still image files 607 to 609.

Subsequently, a restart after she change process of the file name will be described. For example, in the case where the user instructed the restart of the change process of the file name by operating the operation unit 103, the control unit 102 detects the provisional file name of the still image file stored in the memory 105, remaining to be changed, and the file number subjected to the change. The control unit 102 controls the recording and reproducing unit 106 so as to change the file name of each still image file. After completion of the change of the file names of all of the still image files, the control unit 102 deletes the information of the provisional file name of each still image file and the file numbers subjected to the change, from the memory 105. In the case of interrupting the change process again after the restart, the control unit 102 stores the provisional file names of the remaining still image files and the file numbers subjected to the change into the memory 105 and finishes the change process.

Figure 7:
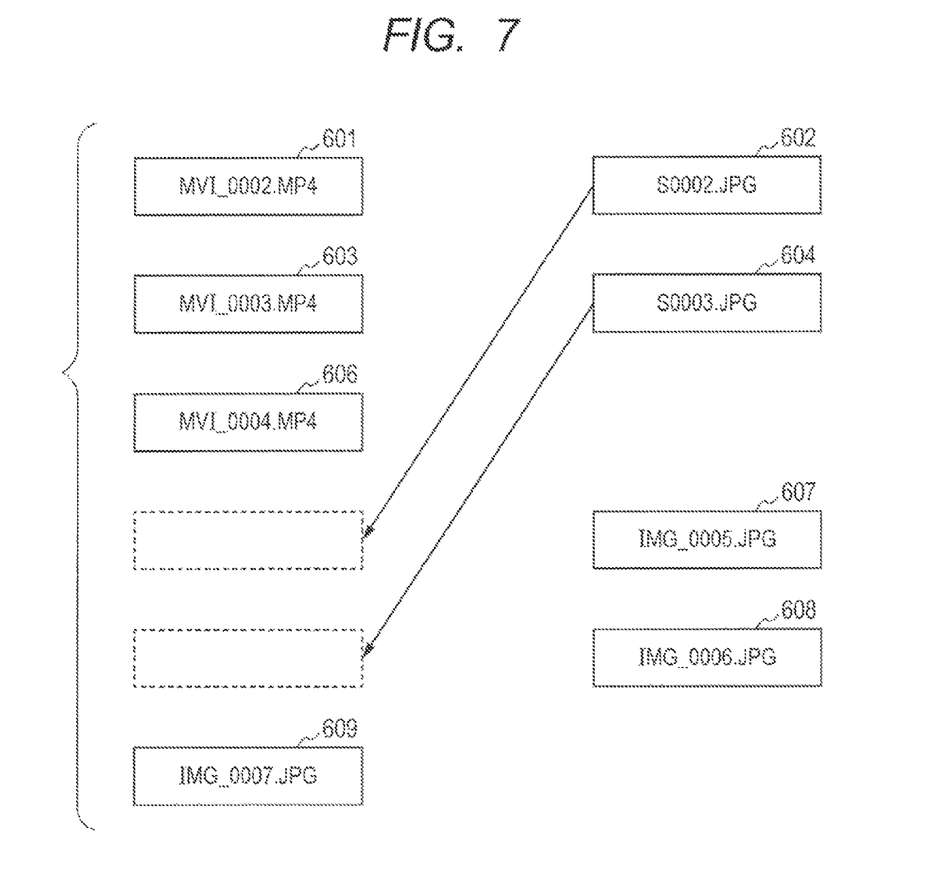
FIG. 7 is a diagram illustrating an example of states of file names at the time of interruption of the change process of the file name in the recording operation according to the first embodiment of the invention.

FIG. 7 illustrates the file names of the moving image files and still image flies at the time of the interruption of the change process of the file name. The same files as those in FIG. 6 are designated by the same reference numerals. For example, FIG. 7 illustrates a state where the change process of the file name is interrupted at a point of time of the completion of the change process of the still image file 609. At this time, the information of the provisional file names of the remaining still image files 602 and 604 and the file numbers 0005 and 0006 which are subjected to the change are stored in the memory 105.

When the change process is restarted, the control unit 102 changes the file names of the still image files 602 and 604 to the file names of the still image files 607 and 608 on the basis of the stored information.

Although the threshold value adapted to divide the file is set to the predetermined size in the present embodiment, for example, the file may be divided each time the moving image data of an amount corresponding to a predetermined time is recorded. In this case, the threshold value is set to the predetermined recording time duration. The control unit 102 generates a new file and counts an elapsed time after the start of the recording. When the predetermined time elapses, a file division instruction is output to the recording and reproducing unit 106. Although the apparatus for recording the moving image data, audio data, and still image data is described in the present embodiment, the invention can be also similarly applied to an apparatus for recording other information data which is input, for example, audio data.

Although the moving image data and audio data are recorded by the MP4 file method in the present embodiment, they can be also recorded by another file method such as an MOV file method or the like.

Although the still image is recorded by the provisional file name and, after the recording of the moving image is finished, the file name of the still image is changed in the present embodiment, the moving image may be recorded by the provisional file name. After completion of the recording of the moving image, the number of the moving image file (one) can be also changed so as to be consecutive to the still image file.

In the case where the change process of the file name is interrupted, the change process is restarted by the instruction from the user. However, even if there is no instruction from the user, the change process can be also automatically restarted by the control unit 102.

For example, it is also possible to construct in such a manner that the control unit 102 restarts the change process of the file name in the recording standby state or when the operation mode is switched to the reproducing mode or an instruction to turn off the power source is received.

Second Embodiment

Subsequently, the second embodiment, will be described. Also in the present embodiment, since a construction of the recording apparatus 100 and its fundamental operation are similar to those in the first embodiment, their description is omitted here.

In the present embodiment, the control unit 102 adds the file number in recording order to each moving image file or the still image file which is recorded during the recording of the moving image and records those files. Further, the control unit 102 generates a list including the information of the file names of one or more moving image files recorded during the moving image recording of one time and the information of the file name of the still image file.

Figure 9:
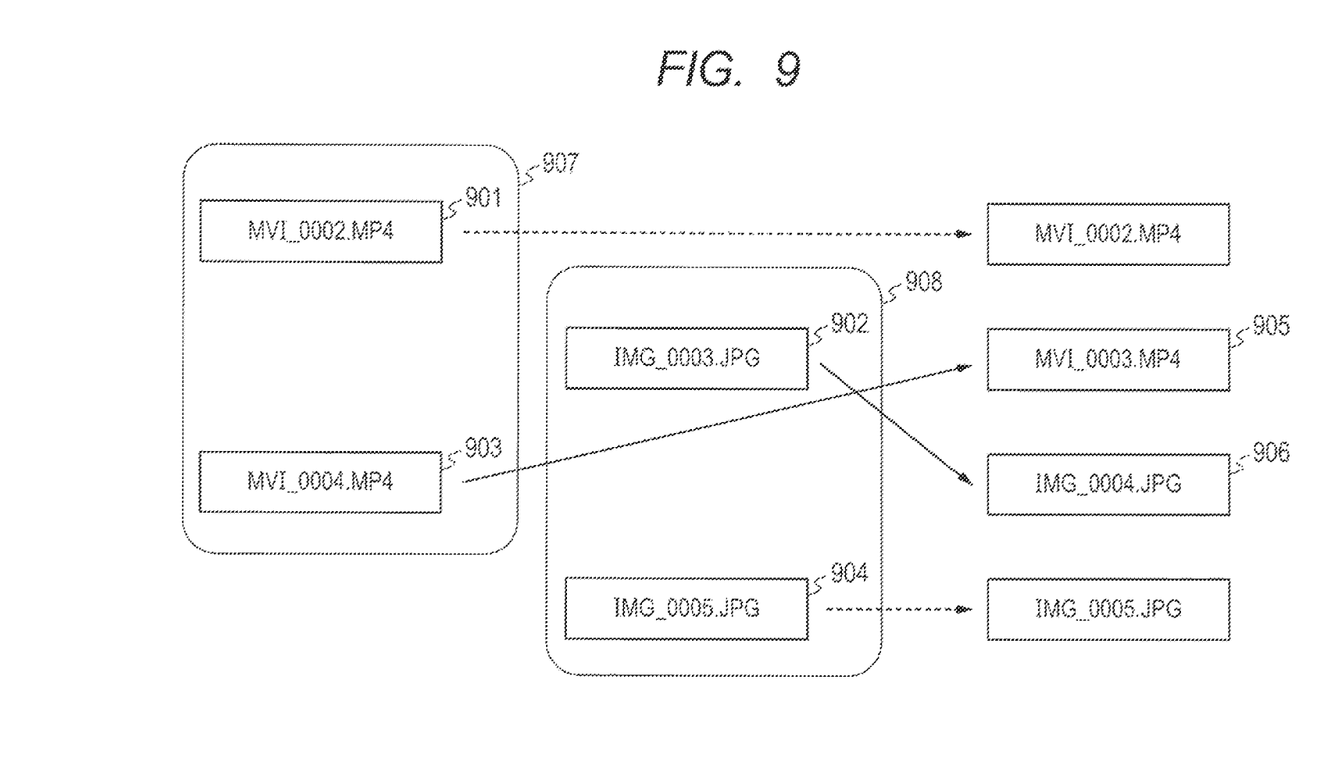
FIG. 9 is a diagram illustrating an example of a change of the file name by the change process of the file name according to the second embodiment.

FIG. 9 illustrates an example of file names which are recorded in the present embodiment. When the recording operation of the moving image is started, the control unit 102 generates a moving image file 901 and a still image recorded during the photographing of the moving image file 901 is recorded as a still image file 902 of a file name using the next number 0003 of the moving image file 901.

Subsequently, when the file size of the moving image file 901 reaches the file division threshold value, a moving image file 903 is generated. As a file name of the moving image file 903, the next number 0004 of the still image file 902 is used. Further, the still image recorded during the photographing of the moving image file 903 is recorded as a still image file 904 with the file name using the next number 0005.

The control unit 102 generates a list showing the file names of each moving image file and the still image recorded during the moving image recording of one time (in a period of time from the recording start instruction to the recording stop instruction of the moving image by the user). When the recording of the moving image is finished, the control unit 102 can generate a moving image file list 907 having the moving image files 901 and 903 and a still image file list 908 having the still image files 902 and 904.

Figure 8:
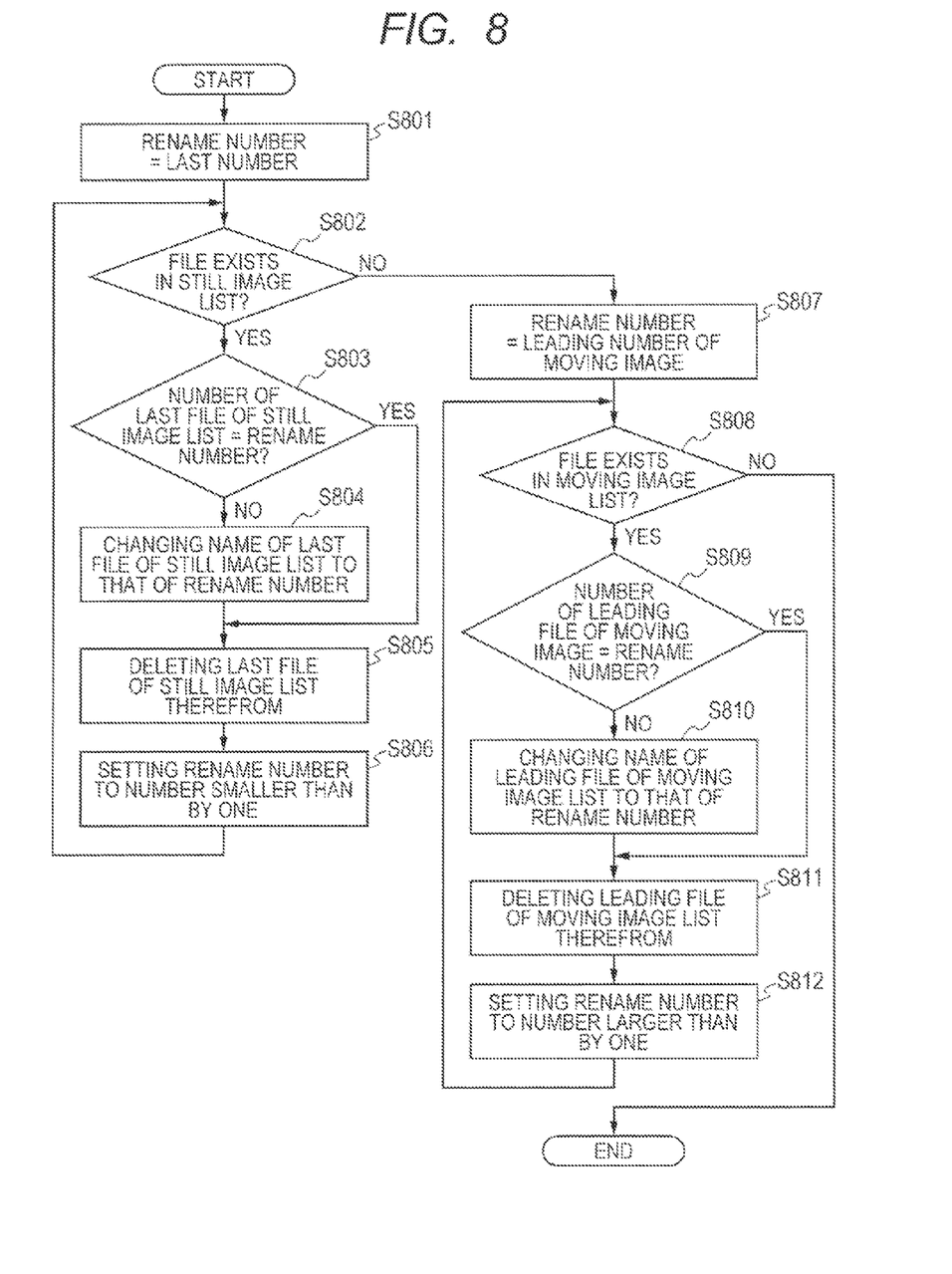
FIG. 8 is a diagram illustrating a flowchart of a change process of a file name in the recording operation according to the second embodiment.

After completion of the recording of the moving image, the change process of the file name is executed. FIG. 8 is a flowchart illustrating the change process of the file name in the recording operation according to the present embodiment.

First, as a number (rename number) which is used as a file name after the change, the control unit 102 sets the last number in the recording of the moving image which is finished (S801). In FIG. 9, the last number is 0005 which is a number of the still image file 904 recorded finally. Subsequently, whether or not a file exists in the still image list is confirmed (S802). If the file exists, whether or not the number of the last file in the still image list is the same as the rename number is confirmed (S803). In FIG. 9, since the file number of the still image file 904 is the same as the rename number, a rename process is not executed but the last file is deleted from the still image list (S805). Subsequently, the rename number is set to the number 0004 which is smaller than the number 0005 by one (S806), and the processing routine is returned to S802.

Since the still image file 902 remains in the still image list (S802), the number of the still image file 902 as a last file is compared with the rename number (S803). Since those numbers differ, the file name is changed to the file name in which the number 0003 of the still image file 902 is changed to 0004 which is a rename number and the file 902 is recorded as a still image file 906 (S804). Subsequently, the still image file 902 as a last file is deleted from the still image list (S805). Whether or not a file exists in the still image list is confirmed again (S802).

Since there are no files in the still image list, the rename number is subsequently set to the leading number of the moving image (S807). In FIG. 9, the leading number of the moving image is 0002 which is the number of the moving image file 901. Subsequently, whether or not a file exists in the moving image list is confirmed (S808) and the number (minimum value) of the leading file of the moving image is compared with the rename number (S809). Since those numbers are equal here, the rename process is not executed but the leading file is deleted from the moving image list (S811). Subsequently, the rename number is set to 0003 which is larger than 0002 by one (S812). The processing routine is returned to the process for confirming again whether or not a file exists in the moving image list (S808). The leading file is the moving image file 903 in FIG. 9 and the rename number differs from the file number of the leading file. Therefore, the file name is changed to the file name in which the number 0004 of the moving image file 903 is changed to 0003 as a rename number and the file 903 is recorded as a moving image file 905 (S810). Subsequently, the moving image file 903 as a leading file is deleted from the moving image list (S811). The rename number is set to 0004 which is larger than 0003 by one (S812). Whether or not a file exists in the moving image list is confirmed (S808). Since there are no files in the moving image list here, the processing routine is finished.

As mentioned above, with respect to the still image files, the change process of the file name is executed in order from the largest file number, and with respect to the moving image files, the change process of the file name is executed in order from the smallest file number. Consequently, since the file numbers of the still image files do not overlap and the file numbers of the moving image files do not overlap, when the change process of the file name is executed, the file names after the change do not overlap.

Although the change process of the file name is started immediately after the completion of the moving image recording in the present embodiment, the change process may be started when a rename process start instruction by she operation unit 103 is received, when a change-over instruction from the recording mode to the reproducing mode is received, or when a power-off instruction by the operation unit 103 is received. In this case, in order to start the change process of the file name in the present embodiment, the following process is necessary. That is, the moving image and still image files recorded in the recording medium 108 are analyzed, the consecutive moving image files are registered to the moving image list from the value of UUID of the moving image file, and the still image file having the number sandwiched between the numbers of the leading and last moving image files in the moving image list is registered to the still image list.

Although the interruption and restart of the change process of the file name are similar to those in the first embodiment, in the second embodiment, the file names and rename numbers existing in each of the moving image list and the still image list generated during the recording operation are stored into the memory.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention is described, with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-035895, filed on Feb. 26, 2013, which is hereby incorporated by reference herein in its entirety.

What is claimed is:

1. A recording apparatus comprising:
an image pickup unit;
a generation unit configured to generate moving image data and still image data by using an image signal obtained by the image pickup unit;
a recording unit configured to record a moving image file including the moving image data and a still image file including the still image data into a recording medium, wherein the recording unit records a plurality of moving image files in the recording medium for a period of time from a recording start instruction by a user to a recording stop instruction by the user, and records the still image file in the recording medium during the recording of the moving image file in accordance with a still image recording instruction provided during the recording of the moving image file; and
a control unit configured to automatically change, after a predetermined still image file has been recorded in the recording medium, a file number of the predetermined still image file which is recorded in the recording medium by the recording unit during the recording of the moving image file to another file number in accordance with a file number of the moving image file which is recorded in the recording medium by the recording unit,
wherein the control unit automatically changes, after the predetermined still image file has been recorded in the recording medium, the file number of the predetermined still image file recorded in the recording medium during the recording of the moving image file in the period of time from the recording start instruction to the recording stop instruction to a predetermined file number consecutive to a file number of the moving image file being recorded at a time of the recording stop instruction in accordance with the file number of the moving image file being recorded at a time of the recording stop instruction.

2. The recording apparatus according to claim 1, wherein:
the control unit adds a file number consecutive to a file number of a moving image file recorded immediately before to each of a plurality of moving image files recorded in the period of time from the recording start instruction to the recording stop instruction and adds a file number consecutive to the file number of the still image file recorded immediately before to each of a plurality of the predetermined still image files recorded in the period of time from the recording start instruction to the recording stop instruction; and
the control unit further changes, after the plurality of the predetermined still image files have been recorded in the recording medium, the file numbers of the plurality of the predetermined still image files to other consecutive file numbers in accordance with the file numbers of the plurality of the predetermined still image files.

3. A recording apparatus comprising:
an image pickup unit;
a generation unit configured to generate moving image data and still image data by using an image signal obtained by the image pickup unit;
a recording unit configured to record a moving image file including the moving image data and a still image file including the still image data into a recording medium, wherein the recording unit records a plurality of moving image files in the recording medium for a period of time from a recording start instruction by a user to a recording stop instruction by the user, and records the still image file in the recording medium during the recording of the moving image file in accordance with a still image recording instruction provided during the recording of the moving image file; and
a control unit configured to automatically change, after a plurality of predetermined moving image files and a predetermined still image file have been recorded in the recording medium, at least one of (i) file numbers of the plurality of the predetermined moving image files recorded in the recording medium by the recording unit in a period of time from the recording start instruction to the recording stop instruction and (ii) a file number of the predetermined still image file which is recorded in the recording medium by the recording unit during the recording of the predetermined moving image file to other file numbers,
wherein the control unit changes, after the plurality of the predetermined moving image files and the predetermined still image file have been recorded in the recording medium, at least one of (i) the file numbers of the plurality of the predetermined moving image files and (ii) the file number of the predetermined still image file in accordance with information related to a recording order of the plurality of the predetermined moving image files and the predetermined still image.

4. A control method of a recording apparatus including an image pickup unit, comprising:
generating moving image data and still image data by using an image signal obtained by the image pickup unit;
recording a moving image file including the moving image data and a still image file including the still image data into a recording medium, wherein the recording includes:
recording a plurality of moving image files in the recording medium for a period of time from a recording start instruction by a user to a recording stop instruction by the user, and
recording the still image file in the recording medium during the recording of the moving image file in accordance with a still image recording instruction provided during the recording of the moving image file; and automatically changing, after a predetermined still image file has been recorded in the recording medium, a file number of the predetermined still image file which is recorded in the recording medium in the recording during the recording of the moving image file to another file number in accordance with a file number of the moving image file recorded in the recording medium in the recording, wherein the automatically changing includes automatically changing, after the predetermined still image file has been recorded in the recording medium, the file number of the predetermined still image file recorded in the recording medium during the recording of the moving image file in the period of time from the recording start instruction to the recording stop instruction to a predetermined file number consecutive to a file number of the moving image file being recorded at a time of the recording stop instruction in accordance with the file number of the moving image file being recorded at a time of the recording stop instruction.

5. A control method of a recording apparatus including an image pickup unit, comprising:

generating moving image data and still image data by using an image signal obtained by the image pickup unit;

recording a moving image file including the moving image data and a still image file including the still image data into a recording medium, wherein the recording includes:

recording a plurality of moving image files in the recording medium for a period of time from a recording start instruction by a user to a recording stop instruction by the user, and recording the still image file in the recording medium during the recording of the moving image file in accordance with a still image recording instruction provided during the recording of the moving image file; and automatically changing, after a plurality of predetermined moving image files and a predetermined still image file have been recorded in the recording medium, at least one of (i) file numbers of the plurality of the predetermined moving image files recorded in the recording medium in the recording in a period of time from the recording start instruction to the recording stop instruction and (ii) a file number of the predetermined still image file which is recorded in the recording medium in the recording during the recording of the predetermined moving image file to other file numbers, wherein the automatically changing includes changing, after the plurality of the predetermined moving image files and the predetermined still image file have been recorded in the recording medium, at least one of (i) the file numbers of the plurality of the predetermined moving image files and (ii) the file number of the predetermined still image file in accordance with information related to a recording order of the plurality of the predetermined moving image files and the predetermined still image file.

6. The recording apparatus according to claim 1, wherein the control unit changes file numbers of a plurality of predetermined still image files recorded in the recording medium during the recording of the moving image file in the period of time from the recording start instruction to the recording stop instruction to consecutive file numbers from the predetermined file number.

7. The recording apparatus according to claim 1, wherein the recording unit closes the moving image file being recorded and generates a new moving image file in accordance with a file size of the moving image file being recorded reaching a predetermined size.

8. The recording apparatus according to claim 3, wherein the control unit changes at least one of (i) the file numbers of the plurality of the predetermined moving image files and (ii) the file number of the predetermined still image file so that the file number of the predetermined still image file is different from each of the file numbers of the plurality of the predetermined moving image files, and the file numbers of the plurality of the predetermined moving image files are different from each other.

9. The recording apparatus according to claim 3, wherein the recording unit closes the moving image file being recorded and generates a new moving image file in accordance with a file size of the moving image file being recorded reaching a predetermined size.

* * * * *